United States Patent [19]
Takahashi et al.

[11] Patent Number: 6,027,832
[45] Date of Patent: Feb. 22, 2000

[54] LEAD ACID STORAGE BATTERY AND METHOD FOR PRODUCING THE SAME

[75] Inventors: Katsuhiro Takahashi, Yawata; Tsuyoshi Hatanaka, Fujiidera; Yoshiaki Nitta, Hirakata, all of Japan

[73] Assignee: Matsushita Electric Industrial Co., Ltd., Osaka-fu, Japan

[21] Appl. No.: 08/906,681

[22] Filed: Aug. 5, 1997

[30] Foreign Application Priority Data

Aug. 13, 1996 [JP] Japan .................................. 8-213787
Apr. 1, 1997 [JP] Japan .................................. 9-083053

[51] Int. Cl.$^7$ .................................................. H01M 4/56
[52] U.S. Cl. ........................ 429/204; 429/225; 429/215; 429/212
[58] Field of Search .................... 429/225, 215, 429/212, 204, 347

[56] References Cited

U.S. PATENT DOCUMENTS 2,345,035  3/1944  Daily et al. ............................ 136/26
4,617,244  10/1986  Greene ................................. 429/203
5,252,105  10/1993  Witherspoon et al. ............... 29/623.1

OTHER PUBLICATIONS

Chemical Abstract No. 118:172600 (from Chinese Patent No. 1065557), Oct. 1992.

Chemical Abstract No.72:62138 ( from Goncharov et al., Efeect of a Hydrazine Sulfate Additive, Tr. Novocherkassk. Politekh. Inst., 190, 118–20.), 1969 month unknown.

Primary Examiner—Maria Nuzzolillo
Assistant Examiner—J. O'Malley
Attorney, Agent, or Firm—Akin, Gump, Strauss, Hauer & Feld, L.L.P.

[57] ABSTRACT

The invention provides a lead acid storage battery with a high utilization at a high rate discharge by incorporating a lead ion solubility adjusting agent into the electrolyte. The agent is selected from polysaccharides, chelating agents, their derivatives, and hydrazinium sulfate.

7 Claims, 11 Drawing Sheets

Addition amount (ppm)

ND METHOD FOR PRODUCING THE SAME

LEAD ACID STORAGE BATTERY AND METHOD FOR PRODUCING THE SAME

BACKGROUND OF THE INVENTION

The present invention relates to an improvement of a lead acid storage battery.

The lead acid storage battery is generally a storage battery using lead dioxide in the positive electrode and lead in the negative electrode as active materials, and dilute sulfuric acid as an electrolyte. And it is the secondary battery most widely used for portable equipment, motor vehicles, industrial applications, and recently for electric vehicles. As a method for producing this lead acid storage battery, there have been historically known paste process, clad process, and Tudor process. Recently, a method of kneading and filling a special resin and lead powder in a lead or lead alloy current collector has been known.

In the battery configuration, too, a wide variety of forms are now put to practical uses from the conventional configuration using an abundant amount of electrolyte to a sealed-type battery which is so limited that the electrolyte is absorbed in a glass mat and oxygen evolving from the positive electrode during overcharging is ionized on the negative electrode.

In any application, size and weight reduction is a common subject, and the utilization improvement of the active material is an endless proposition. However, the fact is that, in the unitization of the active material, the lead acid storage battery is limited to a low level as compared with other battery systems. Recently in particular, the low utilization at a high rate discharge has been a block to further widening applications.

It is known that the utilization even at a low rate discharge of not higher than 0.1 C by the theoretical filling capacity standard is generally at most 50–55% at the positive electrode and 60% or so at the negative electrode on the theoretical filling capacity and drops below a level of 20% at a high rate discharge exceeding 5 C. Generally, the theoretical filling amount of the negative electrode is large as compared with the positive electrode, and the utilization of the positive electrode determines the battery capacity in many cases.

In a long history, much research has been done to solve the problem of low utilization. But no means to essentially improve the utilization has been born. It is considered that the factor to determine the utilization at a high rate discharge is the diffusion or supply of sulfuric acid. To facilitate this supply of sulfuric acid, a method of adding a surfactant or the like to the electrolyte has been tried without practical results, and thus no good way to improve the utilization has been found out except for forming a configuration suited for the diffusion of sulfuric acid. In other words, it has been thought that once a structure is decided upon, there is no means to raise the utilization of the active material.

BRIEF SUMMARY OF THE INVENTION

It is an object of the present invention to find out a way to break through the barrier limiting the diffusion of sulfuric acid within a formed suitable structure and to provide a lead acid storage battery with a high utilization at a high rate discharge.

The present invention is based on a discovery that the addition of a certain special compound in a very small amount is effective in remarkably raising the utilization of the active material, especially at a high rate discharge.

The present invention provides a lead acid storage battery comprising a power generating element and at least one compound selected from the group consisting of a polysaccharide and its derivatives, a chelating agent and its derivatives, and hydrazinium sulfate which is added to the power generating element as a solubility adjusting agent for lead ions. The power generating element comprises a positive electrode, a negative electrode, a separator interposed between the positive electrode and negative electrode, and an electrolyte.

The reason the addition of this lead ion solubility adjusting agent improves the utilization is not clarified yet. But if the solubility adjusting agent for lead ions selected from the group consisting of a polysaccharide, a chelating agent and their derivatives is added in a small amount, a phenomenon will arise that the activity of $Pb^{2+}$ in a strong acid aqueous solution of sulfuric acid will change greatly.

The reaction in the lead acid storage battery both at the positive electrode and the negative electrode is generally called dissolution and deposition reaction, in which $PbO_2$ at the positive electrode and Pb at the negative electrode each produce $Pb^{2+}$ ions electrochemically first, which then chemically react with the sulfuric acid radical to produce lead sulfate. At both electrodes, therefore, the discharge potential is influenced by $Pb^2$ ion. If $Pb^{2+}$ increases in the system of formation reaction product, then the positive electrode potential drops while the negative electrode potential rises, resulting in a decrease in terminal voltage. But it is thought that the negative electrode, where the sulfuric acid radical is easy to move, is not so much influenced by the $Pb^{2+}$ accumulated as a result of formation of lead sulfate as the positive electrode.

The inventors found that the aforementioned polysaccharide, chelating agent and their derivatives are effective in changing the activity of $Pb^{2+}$ in dilute sulfuric acid as a strong acid used in the lead acid storage battery.

Furthermore, the inventors discovered that hydrazinium sulfate acts as a lead ion solubility adjusting agent in the same way as in the aforementioned compounds and that coexistence with the aforementioned polysaccharide, chelating agent or their derivatives in particular will yield synergistic effects of accelerating the increase rate of utilization and further enhancing the effect of polysaccharide, chelating agent, etc.

Hydrazinium sulfate is a substance which is generally used as an additive for removing oxides in alkaline solutions but its properties are not known well. Especially in the acid systems of dilute sulfuric acid, no information is available. Therefore, the mechanism of the additive effect of hydrazinium sulfate that the utilization of the positive electrode increases with the progress of charge and discharge cycles is not clarified yet. However, it is assumed that some change takes place in the dissolved state of lead ions, which works to form lead dioxide which facilitates charging and discharging or to form a structure thereof at the time of charging.

The effect of hydrazinium sulfate on lead oxides in the dissolved state is clear from the following examples. If, for example, the powder of positive electrode active material is suspended in the usual dilute sulfuric acid, a dark brown turbidity may result. In the dilute sulfuric acid mixed with hydrazinium sulfate, however, the brown turbidity fast diminishes and changes are observed in the solubility and decomposability of fine particles of the active material. In the hydrazinium sulfate containing dilute sulfuric acid, much oxygen gas will evolve as compared with the unmixed dilute sulfuric acid; it is possible to convert a part of lead dioxide to lead sulfate or bivalent lead ions through decomposition. With the addition of hydrazinium sulfate alone, however, no change is observed basically in the potential of the positive electrode. This is different from the case where the polysaccharide, chelating agent, or derivative thereof is added.

As to the solubility of lead dioxide, the positive electrode active material remains mostly solid in the dilute sulfuric acid system, and in this way, it is thought that lead dioxide and lead sulfate may act differently, compared to their action in an alkaline solution.

Anyway, the effect of adding hydrazinium sulfate is distinguished in that, although slow, it can be produced after discharging and charging are repeated.

If, however, the polysaccharide or chelating agent coexists with hydrazinium sulfate, that effect will be not only to accelerate the increase rate of utilization of the active material but also to further raise the utilization level eventually reached with the addition of the polysaccharide or chelating agent. This is attributable to the synergistic effect of regenerating the structure of active lead oxide and the activity adjusting effect.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In accordance with the present invention, the power generating element is added with a polysaccharide, chelating agent, their derivative or hydrazinium sulphate as a solubility adjusting agent for lead ions.

The total amount of the lead ion solubility adjusting agent selected from the polysaccharide, chelating agent and their derivatives is preferably not larger than 100 ppm by weight, based on the weight of the electrolyte.

The amount of the hydrazinium sulphate is preferably not less than 100 mg/l, based on the volume of the electrolyte.

As to the solubility adjusting agent for lead ions, the compounds that can be used are, in addition to the aforementioned compounds, those in which an open circuit potential of the positive electrode in a charged state in the dilute sulfuric acid containing the compound in a specific concentration range is higher than that in the dilute sulfuric acid without the compound.

Also suitable are the compounds in which the solubility of lead ions in the dilute sulfuric acid containing the compound in a specific range of concentration is higher than that in the dilute sulfuric acid without the compound and an open circuit potential of the positive electrode in a charged state in the dilute sulfuric acid containing the compound in the specific concentration range is higher than that in the dilute sulfuric acid without the compound.

In the way of comparing the open circuit potential of the positive electrode with the potential in the dilute sulfuric acid with no additive in the charged state, or in the way of comparing the potential of electrolytic oxide of lead or lead alloy with the potential in the dilute sulfuric acid with no additive, the type and addition amount of the solubility adjusting agent for lead ions can be determined.

In a preferred method for producing the lead acid storage battery of the present invention, at least the positive electrode is wetted with a dilute sulfuric acid solution with a high concentration of at least one lead ion solubility adjusting agent selected from the group consisting of a polysaccharide, a chelating agent, their derivatives, and hydrazinium sulfate, and after charging and discharging are repeated, a storage battery is configured using a dilute sulfuric acid solution with a low concentration of the above-mentioned lead ion solubility adjusting agent.

The examples of polysaccharides and its derivatives are given in the following. Mannit, or mannitol ($C_6H_{14}O_6$), is a kind of hexitol and is classified into L-type and D-type. Mannose ($C_6H_{12}O_6$) is a kind of aldohexose polysaccharide and can be reduced to mannitol. Mannonic acid ($C_6H_{12}O_7$) is an oxidized derivative of mannose. Manool ($C_{20}H_{34}O$) and manninotriose ($C_{18}H_{32}O_{16}$) are a kind of trisaccharide. Mandelic acid ($C_8H_8O_3$) is one of α-hydroxy acids. Not only those mannan types but also disaccharides such as maltose and trisaccharides show a similar behavior although different in degree. Those have macromolecular structures and, in addition, possess functional groups with a high polarity like $CH_2OH$ group and COOH group. And since hydrogen at the end is substituted by an alkali ion, they are generally stabilized in many cases.

Though generally not called chelating agent, those polysaccharides and their derivatives, if added to dilute sulfuric acid in a proper amount, not larger than 1,000 ppm, greatly change the solubility of lead ions as can be measured by ICP spectrometry. This is because the molecules of the dissolved polysaccharides or their derivatives coordinate to $Pb^{2+}$ and raise the apparent lead solubility in dilute sulfuric acid more than in dilute sulfuric acid with no additive; polysaccharides and their derivatives exhibit a function as a kind of lead ion solubility adjusting agent in dilute sulfuric acid.

According to the traditional understanding, the potential of the active material lead dioxide decreases with the increase in the amount of dissolved $Pb^{2+}$. In the dilute sulfuric acid containing the above-mentioned lead solubility adjusting agent, however, the potential of the positive electrode rises, showing a phenomenon reverse to the aforementioned phenomenon in a relationship between the potential and the solubility. This indicates that the coordination of the additive molecules probably decreases the real activity of lead ions inside the porous active material in a region where the apparent lead ion solubility rises. It is surmised that in the pores of the positive electrode where the diffusion of sulfuric acid is hindered, the activity of lead ions in the electrolyte containing a compound exhibiting the lead ion solubility adjusting function of the present invention practically decreases as compared with the electrolyte with no additive, resulting in a rise in potential and an improvement in utilization.

The inventors discovered that a behavior similar to that is observed with compounds called chelating agent. Among them, it was found that the compounds which show high chelate stabilization for lead ions, that is, an alkali-stabilized compound hydrate of ethylenediaminetetraacetic acid (hereinafter referred to as "EDTA") $C_{10}H_{13}N_2O_8K_3 \cdot 2H_2O$, ethylenedioxy bis(ethylamine)-N, N, N', N' tetraacetic acid (hereinafter referred to as "GEDTA") $[CH_2OCH_2CH_2N(CH_2COOH)_2]_2$, diethylenetriamine pentaacetic acid (hereinafter referred to as "DTPA") $[HOOCCH_2)_2NCH_2CH_2]_2NCH_2COOH$, trans-1, 2-cyclohexanediamine-N,N,N',N' tetraacetic acid hydrate (hereinafter referred to as "CyDTA") $C_6H_{10}N_2(CH_2COOH)_4 \cdot H_2O$, triethylene tetramine-N, N, N', N, N''', N'''' hexaacetic acid (hereinafter referred to as "TTHA") $[CH_2N(CH_2COOH)CH_2CH_2N(CH_2COOH)_2]_2$, nitrilotriacetic acid (hereinafter referred to as "NTA") $(HOCOCH_2)_3N$ are effective in improving the solubility of lead ions and the potential behavior and utilization in a very small amount in the same way as in the aforementioned polysaccharides.

It is generally known that acetic acid corrodes lead. If acetic acid raises the solubility of lead, then the addition of acetic acid must lower the potential of the positive electrode and increase the potential of the negative electrode. The chelating agent of the present invention shows a behavior opposite to acetic acid in the direction of change in potential and, therefore, is basically different from usual acetic acid in property.

That is, it is conjectured that in the lead ions to be measured, there exist lead ions which actually work as an activity improver and lead ions which can not function as a chemically coordinated activity improver, and in usual measurements of dissolved lead by ICP spectrometry, the apparent solubility of the combination of the two is determined. Those additives, which shift the potential of the negative electrode in the lightly anodic direction, do not have much influence nor induce any particular adverse effect.

As shown, polysaccharides, chelating agents, and their derivatives dissolve in the electrolyte and change the solubility of lead ions, creating a new effect. Therefore, those compounds, if applied on the electrode plate or separator, eventually dissolve in the electrolyte and show a similar effect. To have them work effectively inside the pores of the porous active material, however, they should be added in the form of powder or aqueous solution at the time of kneading the active material, or the unformed plate or the formed plate should be wetted with the electrolyte or aqueous solution containing those compounds; those methods are effective especially when the addition amount is very small. Those compounds can be combined freely if necessary. Also noted is that the conventional additives used in the electrode plate or electrolyte for other purposes such as, for example, lignin, lignosulfonic acid, sodium sulfate, potassium sulfate, potassium salt and sodium salt of tetraboric acid and a variety of surfactants have nothing to do with the mechanism of the present invention; and the present invention does not affect nor is affected by those conventional effects.

Currently available hydrazinium sulfates are hydrazinium sulfate (1+) represented by the chemical formula $(N_2H_5)_2SO_4$ and hydrazinium sulfate (2+) represented by the chemical formula $N_2H_6SO_4$. Hydrazinium sulfate (1+) is one with $(H_2N-NH_3)^+$ combined with $SO_4^{2-}$ and $N_2H_5^+$ by hydrogen bonds. Hydrazinium sulfate (2+) is said to be composed of $(H_3N-NH_3)^{2+}$ and $SO_4^{2-}$. Hydrazinium sulfate (1+) and hydrazinium sulfate (2+) are water soluble crystals with a solubility of 202 g/100 g and 3.4 g/100 g, respectively. Also, they can take the form of $N_2H_4 \cdot 2H_2SO_4$. Those can be obtained by reacting hydrazine with sulfuric acid, and therefore even if this substance is added to sulfuric acid in the form of hydrazine, the effects obtained are similar to those produced with hydrazinium sulfate, and come within the scope of the present invention. But in making a preparation, it is preferable to handle it in the form of hyrazinium sulfate because it is stable when dissolved. At any rate, since hydrazinium sulfate is soluble, it will eventually dissolve in the electrolyte and exhibit the effect of improving the utilization in whichever stage or in whatever form it is added before the power generating element is put in operation—kneading into the active material, impregnating the unformed or formed plate in the form of solution, adding to the electrolyte for formation, adding to the finished electrolyte, impregnating the separator with the solution and drying, etc., for example.

As to the preferred manufacturing process with the addition of hydrazinium sulfate to the power generating element of the lead acid storage battery, the simplest is to add hydrazinium sulfate to dilute sulfuric acid to be used in the electrolyte and to prepare an electrolyte for formation or a finished electrolyte. The form in which these kinds of hydrazinium sulfate are added may be either crystal state or solution state.

As regards the amount of addition, several mg per liter of the electrolyte used as the power generating element can have some effect, but the addition at not lower than 100 mg/l is preferable to achieve substantial effects.

Hydrazinium sulfate (1+) and hydrazinium sulfate (2+) produce similar results and can be used alone or in combination. Because hydrazinium sulfate (2+) is low in solubility (3.4 g/100 g), it can be prepared into a saturated solution of a fixed concentration by adding it excessively.

When hydrazinium sulfate is used together with a polysaccharide, chelating agent or their derivative, these additives can be added in the step of making the power generating element. They can also be added in a crystal or aqueous solution. In practice, the simplest way is to electroform in a dilute sulfuric acid electrolyte containing those additives or complete a lead acid storage battery using a dilute sulfuric acid electrolyte containing those additives.

Figure 1:
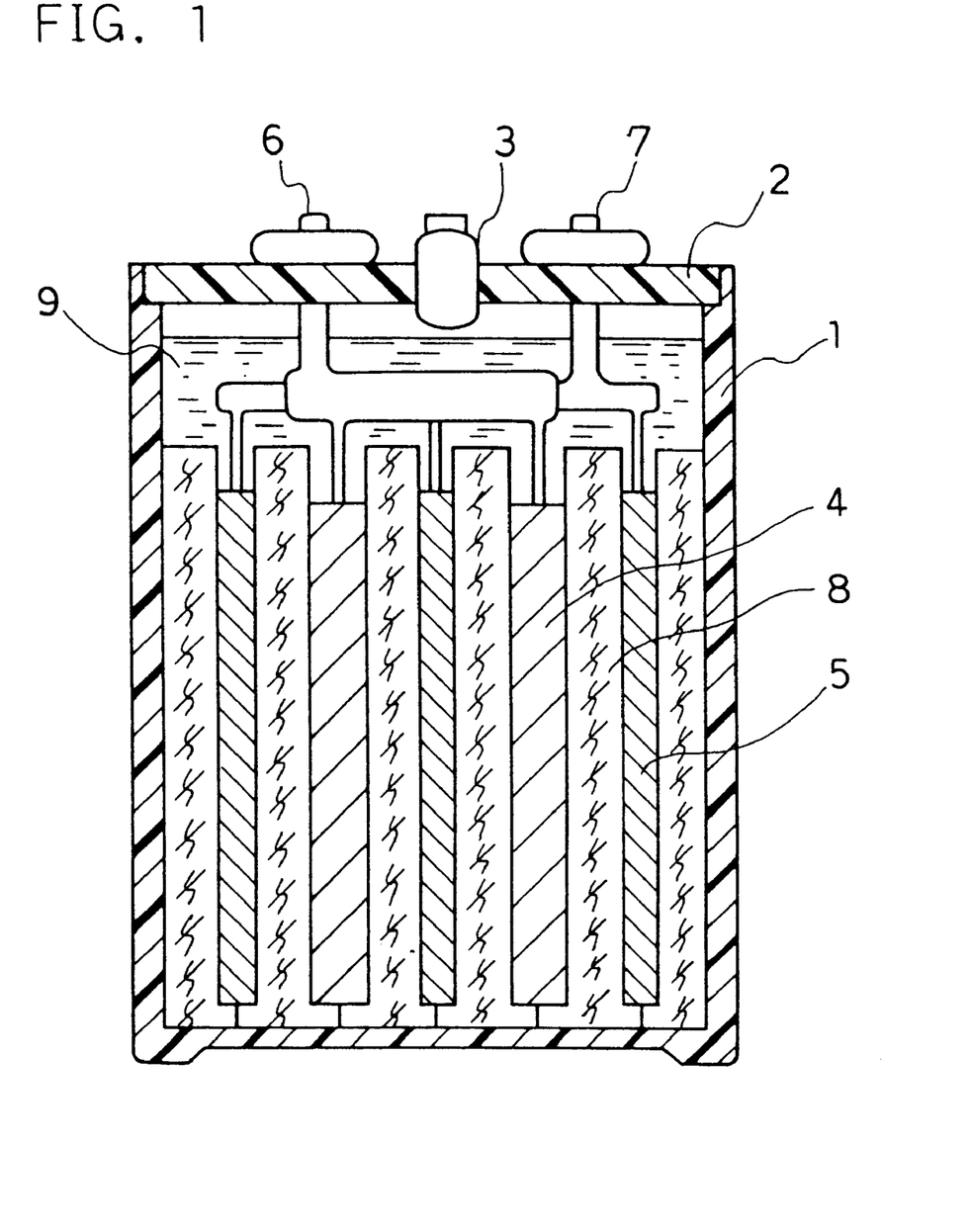
FIG. 1 shows a vertical section of a lead acid storage battery of an embodiment of the present invention.

The present invention will now be described in more detail with reference to the following specific, non-limiting examples:

FIG. 1 shows the configuration of a lead acid storage battery applying the present invention. Numeral 1 indicates a battery container, 2 a cover, 3 a safety valve or a release valve, 4 a positive electrode, 5 a negative electrode, 6 a positive electrode terminal, 7 a negative electrode terminal, 8 a separator, and 9 an electrolyte.

If the electrolyte is wetted on a mat-like separator, the effect of the prevent invention remains unchanged.

The positive and negative electrodes used were paste electrode plates for commercially available storage batteries. The size of the electrode plate was approximately 46 mm×55 mm. Storage batteries with a 5-hour rate capacity of 3.0 Ah were fabricated using two positive electrode plates having a theoretical filling capacity of about 3.0 Ah in terms of lead dioxide and three negative plates having a theoretical filling capacity of 2.2 Ah. Using 36.5 wt % dilute sulfuric acid in the completely discharged state as a reference solution, the electrolyte was prepared by adding to it at least one compound selected from the group consisting of polysaccharides, chelating agents and their derivatives. Those storage batteries were examined for the utilizations at different discharge rates.

Embodiment 1

The above-mentioned reference dilute sulfuric acid solution was mixed with, as a compound selected from among polysaccharides and their derivatives, mannitol [A1], mannose [A2], mannonic acid [A3], manool [A4], manninotriose [A5], mandelic acid [A6] and, as chelating agents and their derivatives, EDTA [B1], DTA [B2], DTPA [B3], CyDTA [B4], TTHA [B5], NTA [B6]. Storage batteries were configured using electrolytes mixed with 50 ppm of those compounds. With those storage batteries, the discharge rate/utilization relationship was examined. Those storage batteries were divided into [A series] and [B series]. Data codes are parenthesized in [], and no addition is indicated by [RO].

Embodiment 2

Storage batteries were composed using the aforementioned reference dilute sulfuric acid solution mixed with 25 ppm of mannitol and 25 ppm of mannose [C1], 25 ppm of EDTA and 25 ppm of NTA [C2], and 25 ppm of mannitol and 25 ppm of EDTA [C3] as the electrolyte, respectively. With those storage batteries, the discharge rate/utilization relation was examined. Those storage batteries are called [C series].

Embodiment 3

Storage batteries were produced using the aforementioned reference dilute sulfuric acid solution mixed in a range of 1–1000 ppm of mannitol as the electrolyte. The utilization of those storage batteries at a discharge rate of 1 C was measured. Those storage batteries are called [D series].

Embodiment 4

Storage batteries were produced using the aforementioned reference dilute sulfuric acid solution mixed in a range of 1–1000 ppm of EDTA as the electrolyte. The utilization of those storage batteries at the discharge rate of 1 C was measured. Those storage batteries are called [E series].

Embodiment 5

Storage batteries [F] were produced using an electrode plate obtained by adding mannitol 1,000 ppm by weight of the active material to the kneading positive electrode active material at the time of its kneading, and the unmixed reference dilute sulfuric acid solution as the electrolyte. The discharge rate/utilization of those storage batteries was determined after 10 cycles of charging and discharging.

Embodiment 6

Storage batteries were produced using, as an electrode plate, the conventional electroformed plate dipped in the reference solution containing mannitol in a saturated state [G1] and an electrode plate [G2] charged in the above-mentioned saturated solution and the unmixed reference dilute sulfuric acid solution as the electrolyte.

The characteristics of the storage batteries of the examples are hereinafter described.

Here, the theoretical filling amount of the positive electrode active material was set to 6 Ah/cell, but a capacity at a 5-hour rate discharge was 3 Ah, so 3 A discharge was taken as 1 C. And the utilization was expressed as 100% when the discharge capacity was 6 Ah.

Figure 2:
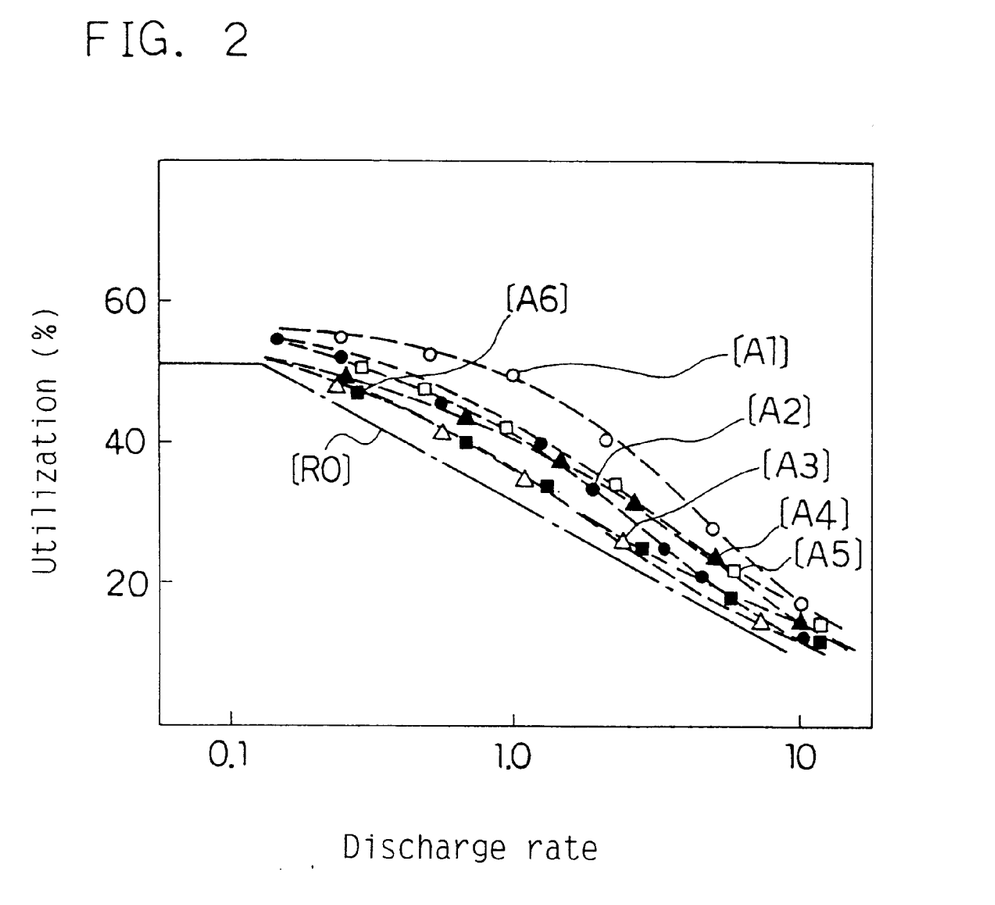
FIG. 2 is a diagram showing the discharge rate/utilization characteristics of the lead acid storage batteries of the embodiment.

FIG. 2 shows the discharge rate/utilization relations of [A series] in Embodiment 1, illustrating the effect of the addition of polysaccharides and their derivatives. The case of no addition [RO] shows a typical utilization characteristic made up of a flat section for low discharge rate and a slant section for high discharge rate. In the batteries of the present invention, little improvement was observed in utilization on the flat section but a remarkable effect was seen on the slant section for high discharge rate. Curves representing the characteristics are slightly different in shape depending on the compound added.

Figure 3:
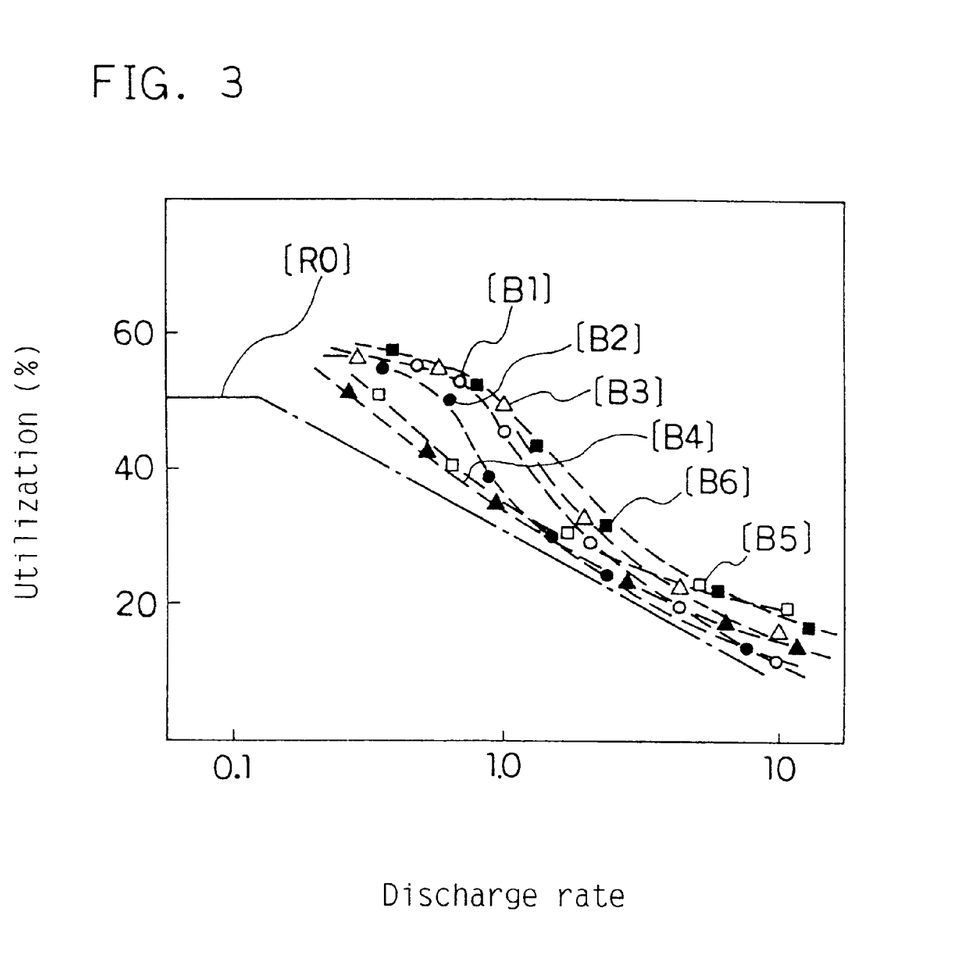
FIG. 3 is a diagram showing the discharge rate/utilization characteristics of other lead acid storage batteries of another embodiment.

FIG. 3 is also a diagram showing the discharge rate/utilization relationship of [B series] in Embodiment 1, which illustrates the effect of the addition of chelating agents and their derivatives. In this case, too, much improvement in utilization was observed as in the case of [A series]. Especially in the slant section, there was remarkable improvement in utilization in a region of relatively low discharge rate. It is thought that the shape and degree of those effects observed are probably closely related to the solubility of the respective compounds, the stability of coordination compound and others.

Figure 4:
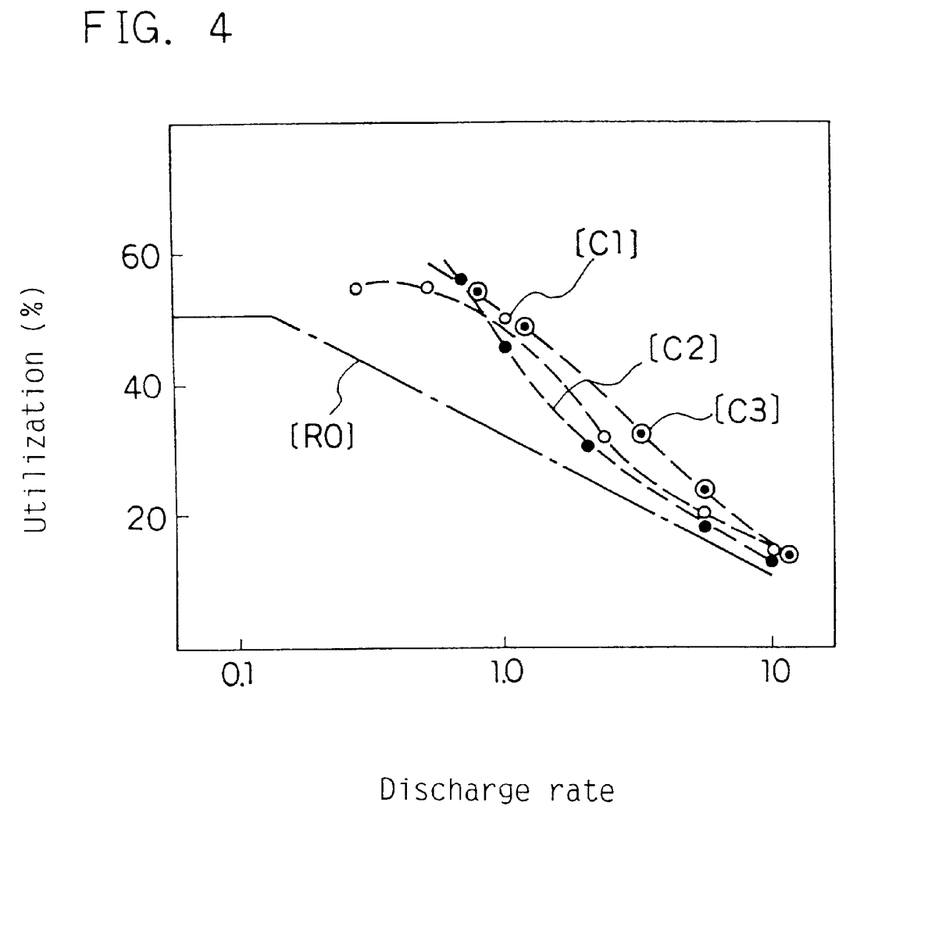
FIG. 4 is a diagram showing the discharge rate/utilization characteristics of lead acid storage batteries of another embodiment.

FIG. 4 is a diagram showing the discharge rate/utilization relationship where two or more additives according to Embodiment 2 are used. Shown are the case where two kinds are selected from among the polysaccharides and their derivatives [C1], the case where two kinds are picked up from among the chelating agents and their derivatives [C2], and the case where one each is chosen from the former and the latter [C3]. In any case, the utilization on the slant section is improved as compared with the case of no addition [RO]. It is also shown that the mixing of polysaccharide compounds and chelating agent compounds can develop the respective characteristics comprehensively.

Figure 5:
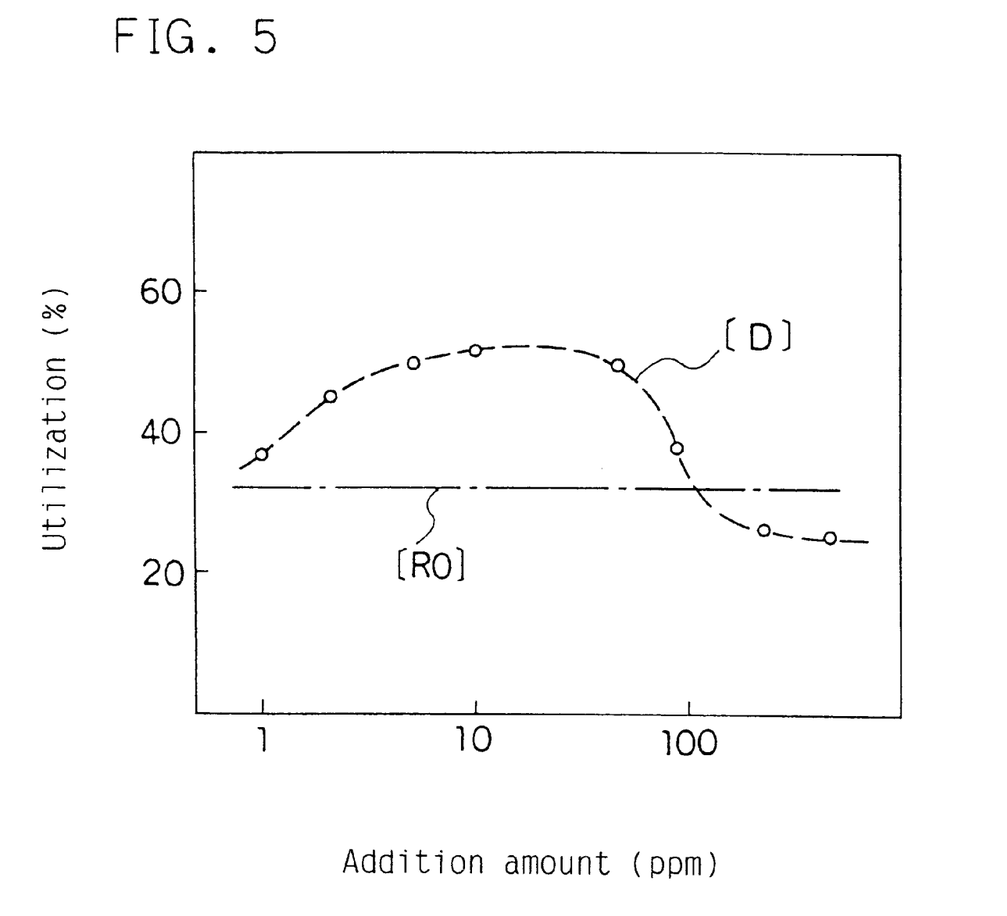
FIG. 5 is a diagram showing the relationship between the addition amount of a lead ion solubility adjusting agent and the utilization.

FIG. 5 shows the effect and the amount of additives of the present invention citing the case of mannitol. Shown is the utilization at 1 C discharge in relation to the concentration of the additive. In the figure, the shown level represents the utilization for [RO] (the case of no addition), irrespective of the amount of the additive. With mannitol, a remarkable effect was observed in a region where the concentration of the additive was not higher than 100 ppm. When the concentration of additive exceeded 100 ppm, the utilization tended to drop instead. Such a borderline concentration between the effective region and the ineffective region (effective borderline region) is about 100 ppm with many additives of this kind, though slightly different by additives.

Figure 6:
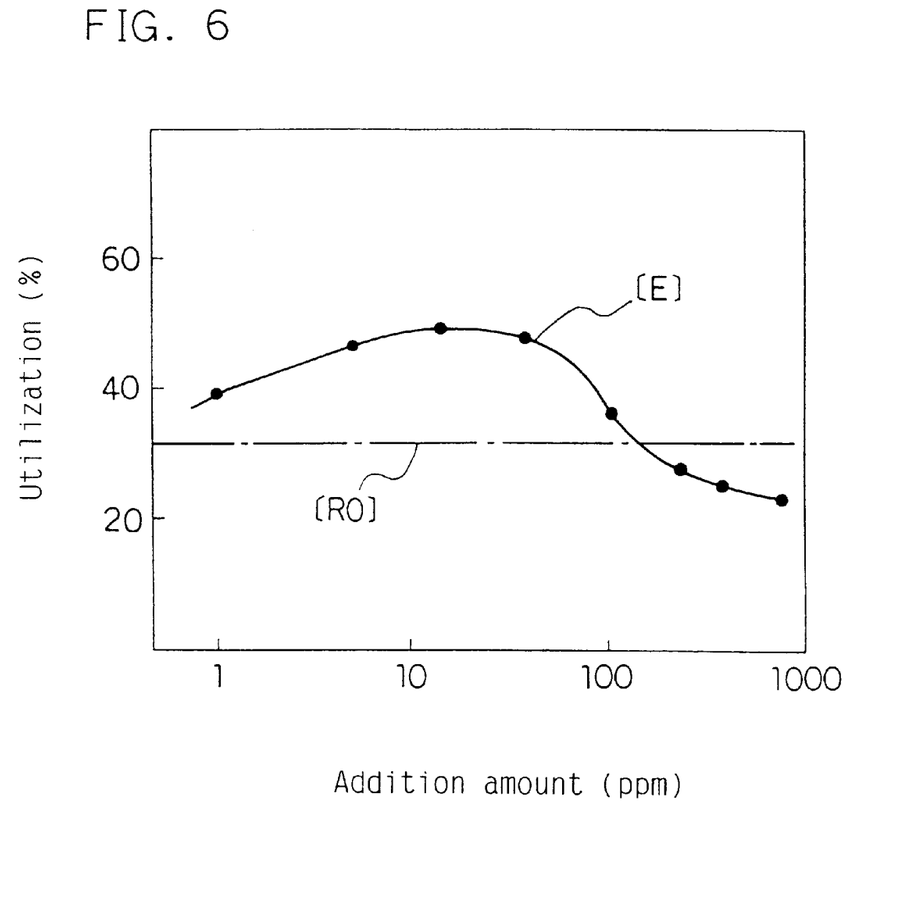
FIG. 6 is a diagram showing the relationship between the addition amount of another lead ion solubility adjusting agent and the utilization.

Similarly, FIG. 6 shows a relationship between the addition amount of EDTA and the utilization at 1 C discharge. In this case, the same pattern was observed as in the mannitol that the effectiveness was observed in the low concentration region.

Figure 7:
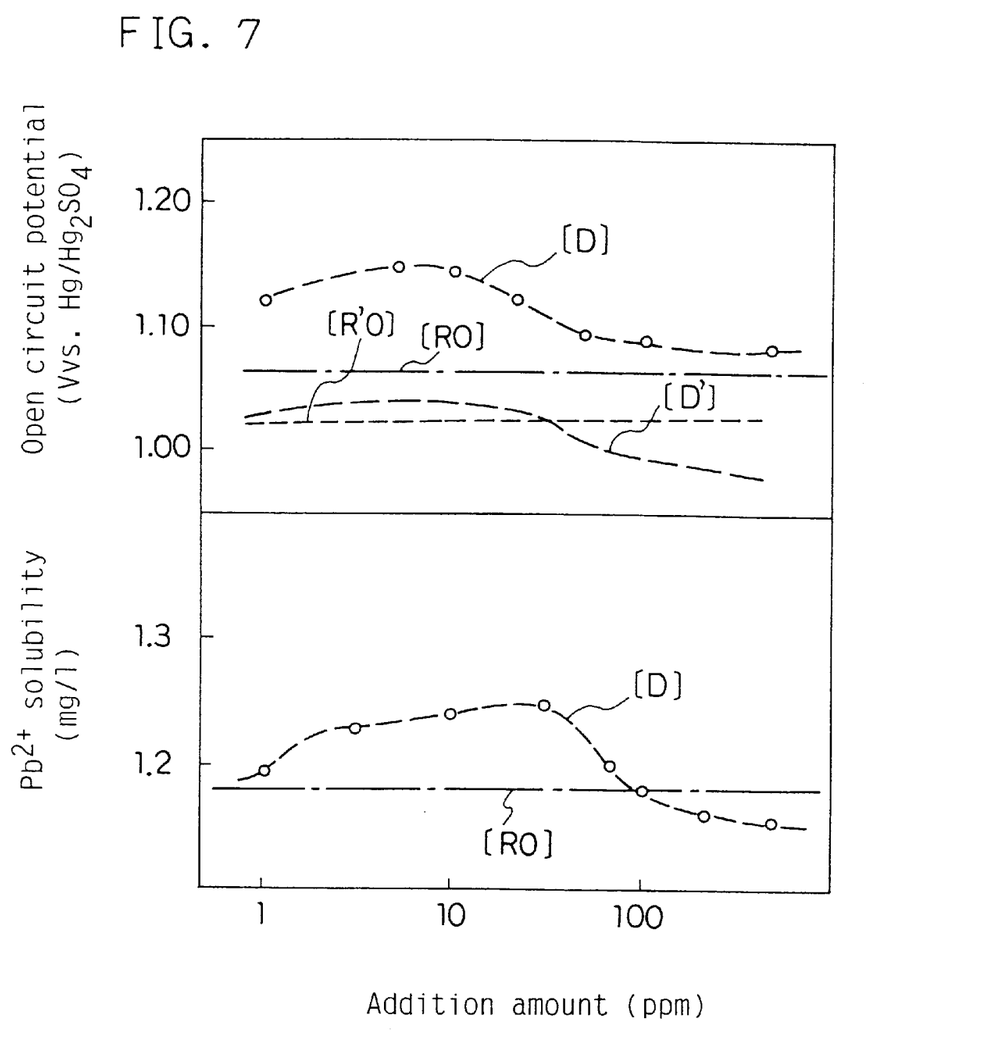
FIG. 7 is a diagram showing the relationship between the addition amount of a lead ion solubility adjusting agent, the open circuit potential of the positive electrode and the concentration of dissolved lead ions.

As to the reason why such a phenomenon appears, FIG. 7 offers an important clue. This figure shows the relationship between the concentration of mannitol, the open circuit potential of the positive electrode in the electrolyte containing mannitol, and the saturated concentration of $Pb^{2+}$ ions determined by adding excess lead sulfate to each electrolyte. As is evident from the figure, there is a good agreement between the change in utilization shown in FIG. 5 and the change in open circuit potential and the change in lead ion concentration in FIG. 7. But the behavior in potential and lead ion concentration is opposite to the generally known relationship as already mentioned. That is, the lead ion concentration measured here is an apparent concentration, and it is surmised that the actual activity dropped substantially because of coordination of the additive. Also noted is that those equilibrium relations do not appear to apply the case where the addition amount is large.

Anyway, the above-mentioned effective region appears in the area where the addition amount is relatively very small. Moreover, the effective addition amount area can be predicted by measuring the open circuit potential as shown. It is possible to make a search for many other compounds which are not cited as examples here.

Rather than a means of search, it is a means to indicate that a compound which increases the positive electrode potential as compared with the case of no addition lowers the activity of lead ions at the same time.

[D'] in FIG. 7 is an open circuit potential measured in the absence of any active material by subjecting a lead plate to electrolytic oxidation. Shown is the potential of a relatively thin oxide layer unlike the porous lead dioxide represented by [D], which is lower than that of an electrode plate provided with many pores. Nevertheless, the potential changed in correspondence with relation to the concentration of the additive in the same way as in the case of an electrode plate, showing an effective concentration region and an ineffective region. In the ineffective region, too, a phenomenon was observed that the potential of oxidized lead on the surface was extremely low or fast dropped. In the effective concentration region, on the other hand, a relatively high and stable potential was observed. This shows that even without an electrode plate, electrolytic oxidation of a lead or lead alloy plate and subsequent examination of its stability enable a search on effective additive material and effective amount of addition. It is noted that [R'O] in FIG. 7 represents an open circuit potential measured in the absence of active material by subjecting a lead plate to electrolytic oxidation in the case where no lead ion solubility adjusting agent was added.

Figure 8:
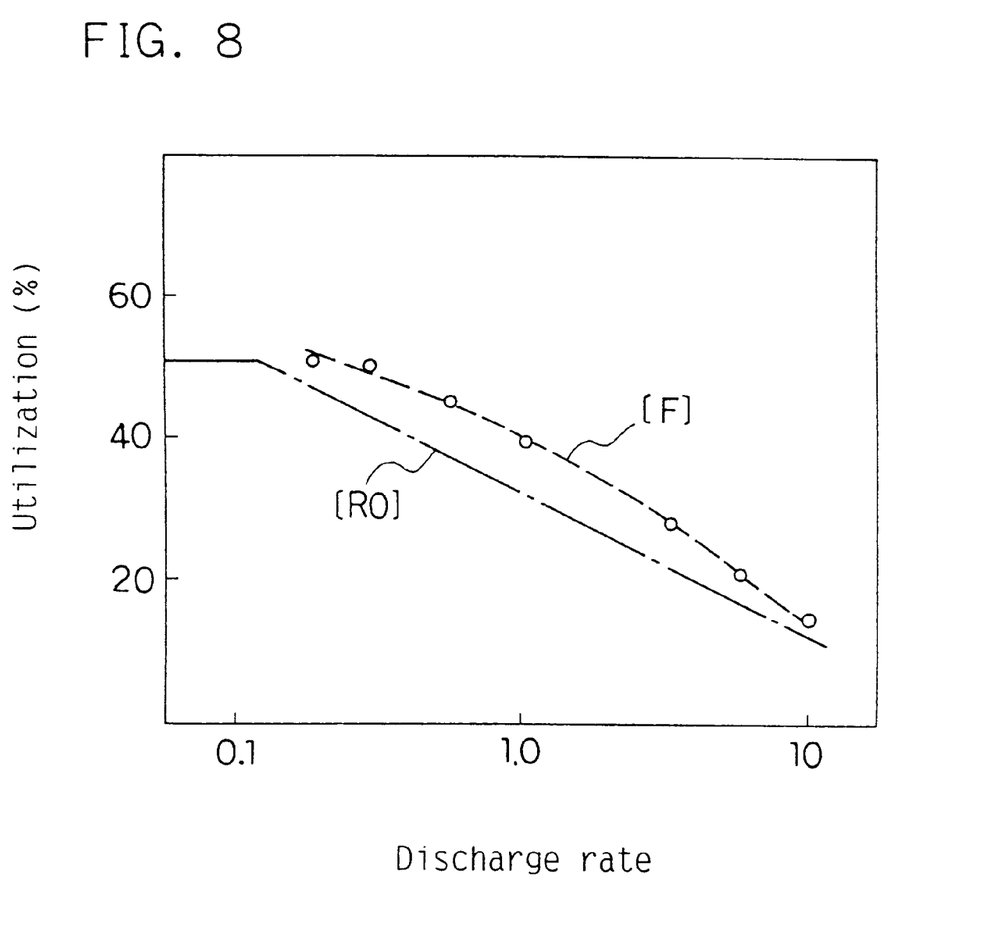
FIG. 8 is a diagram showing the discharge rate/utilization characteristics of lead acid storage batteries of still another embodiment of the present invention.
Figure 9:
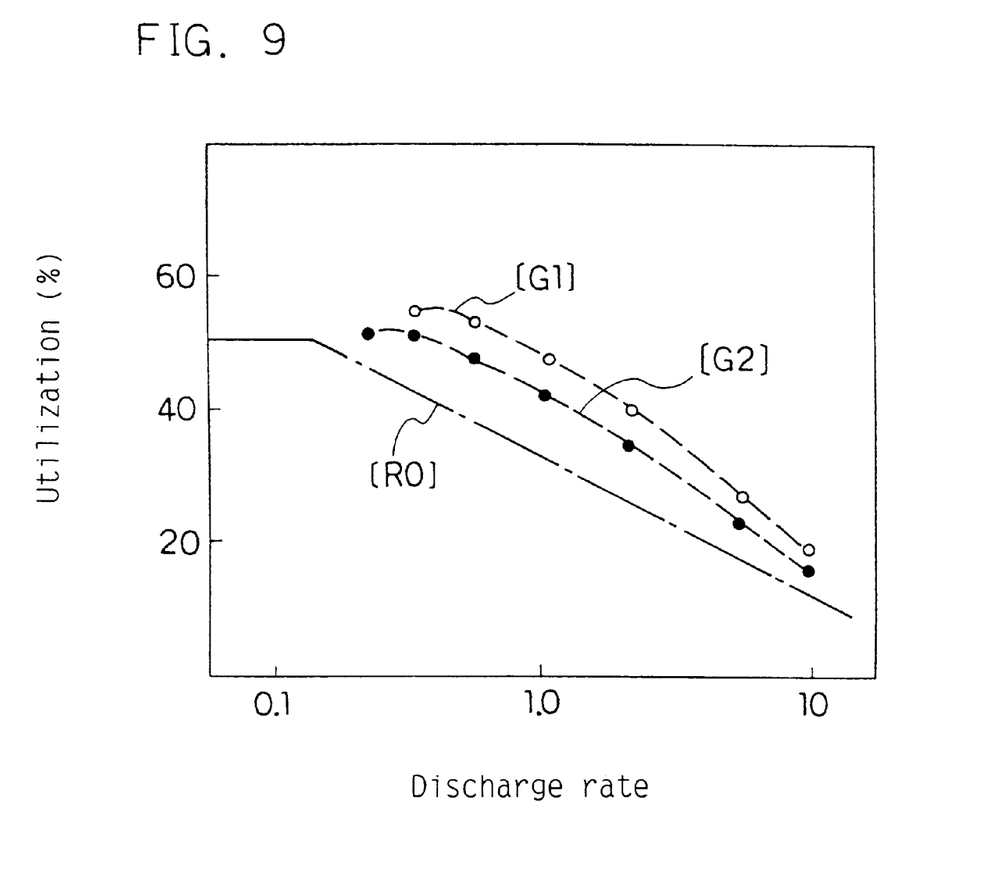
FIG. 9 is a diagram showing the discharge rate/utilization characteristics of lead acid storage batteries of a further embodiment.

Meanwhile, FIG. 8 shows cases where an effect of addition can be produced by adding manniotol at the time of kneading the active material as in Embodiment 5. It indicates that even if an electrolyte with no additive is used, the utilization can be eventually improved as the additive dissolves. [G1] in FIG. 9 shows that even if the electrode plate is wetted with the additives of the present invention at the level of electroformed plate in Embodiment 6, an effect can be obtained. Further, [G2] presents very important information that even if a high concentration region is passed through where no effect is produced and rather degradation is brought about instead, an effective region can be eventually brought back by applying the electrolyte in the region of low concentration or no addition.

Hereinafter, the lead acid storage batteries to be used in Embodiments 7 to 13 are described. For the positive and negative electrodes, paste electrode plates were used. The size of the electrode plate was about 46×55 mm. Six cells were configured, each including two positive electrode plates having a theoretical filling capacity of about 3.0 Ah in terms of lead dioxide and three negative electrode plates having a theoretical filling capacity of 2.2 Ah, and the six cells were connected in series and a storage battery having a nominal voltage of 12 V and a 5-hour rate capacity of 3.0 Ah was produced. The reference electrolyte used was 36.5 wt % dilute sulfuric acid in the completely charged state. It was mixed in the compositions given below with hydrazinium sulfate, polysaccharides, chelating agents or their derivatives in the specified quantities on the basis of the embodiments shown below. It is noted here that the capacity of the battery is restricted by the positive electrode capacity.

Those storage batteries were charged and discharged by combining a constant-current discharge at a constant current (15 A) equivalent to 5 C(A) with a constant-voltage-constant-current charging at a set current of 15 A and a set voltage of 13.5 V, using a positive electrode filling capacity of 1 C (A) as reference. Subsequently, the changes in utilization were examined.

The effect of hydrazinium sulfate is observed in a wide range, but the examples where characteristic effects were observed are hereinafter described.

Embodiment 7

One g/l of hydrazinium sulfate (+1) was added to dilute sulfuric acid to prepare an electrolyte. This storage battery is called [H1].

Embodiment 8

One g/l of hydrazinium sulfate (+2) was added to dilute sulfuric acid to prepare an electrolyte. This storage battery is called [H2]

Embodiment 9

0.5 g/l of hydrazinium sulfate (+1) and 0.5 g/l of hydrazinium sulfate (+2) were added to dilute sulfuric acid to prepare an electrolyte. This storage battery is called [H3].

Embodiment 10

One g/l of hydrazinium sulfate (+1) and 20 mg/l of mannitol were added to dilute sulfuric acid to prepare an electrolyte. This storage battery is called [I1].

Embodiment 11

One g/l of hydrazinium sulfate (+2) and 20 mg/l of mannitol were added to dilute sulfuric acid to prepare an electrolyte. This storage battery is called [I2].

Embodiment 12

One g/l of hydrazinium sulfate (+1) and 50 mg/l of EDTA were added to dilute sulfuric acid to prepare an electrolyte. This storage battery is called [J1].

Embodiment 13

One g/l of hydrazinium sulfate (+2) and 50 mg/l of EDTA were added to dilute sulfuric acid to prepare an electrolyte. This storage battery is called [J2].

COMPARATIVE EXAMPLES

As comparative examples, a storage battery [RO] using an electrolyte of 36.5 wt % dilute sulfuric acid containing no additives, a storage battery [D1] using an electrolyte of 36.5 wt % dilute sulfuric acid containing no hydrazinium sulfate but 20 mg/l of mannitol, and a storage battery [E1] using an electrolyte of 36.5 wt % dilute sulfuric acid containing no hydrazinium sulfate but 20 mg/l of EDTA were fabricated.

Figure 10:
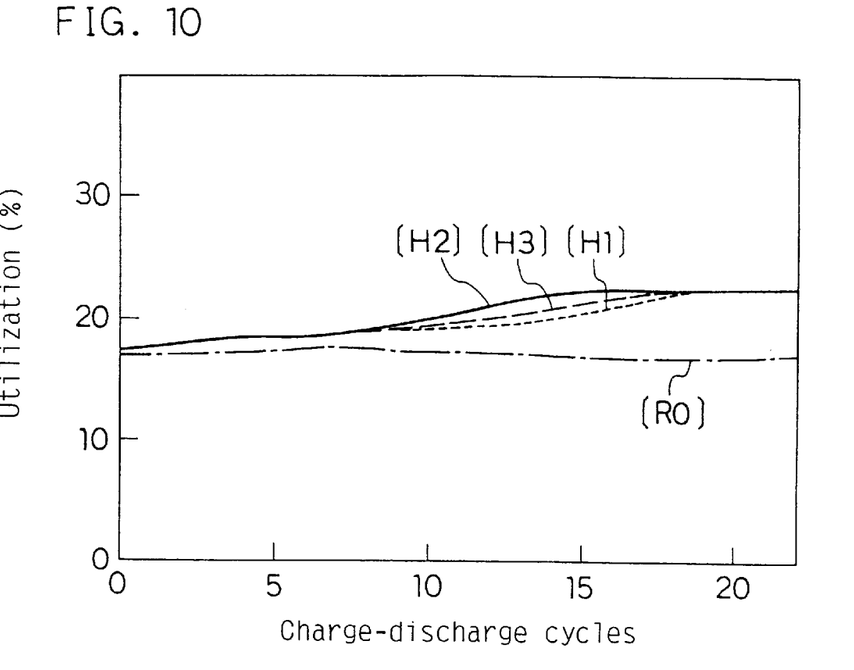
FIG. 10 is a diagram showing the charge-discharge cycles/utilization characteristics of lead acid storage batteries of another embodiment of the present invention.
Figure 11:
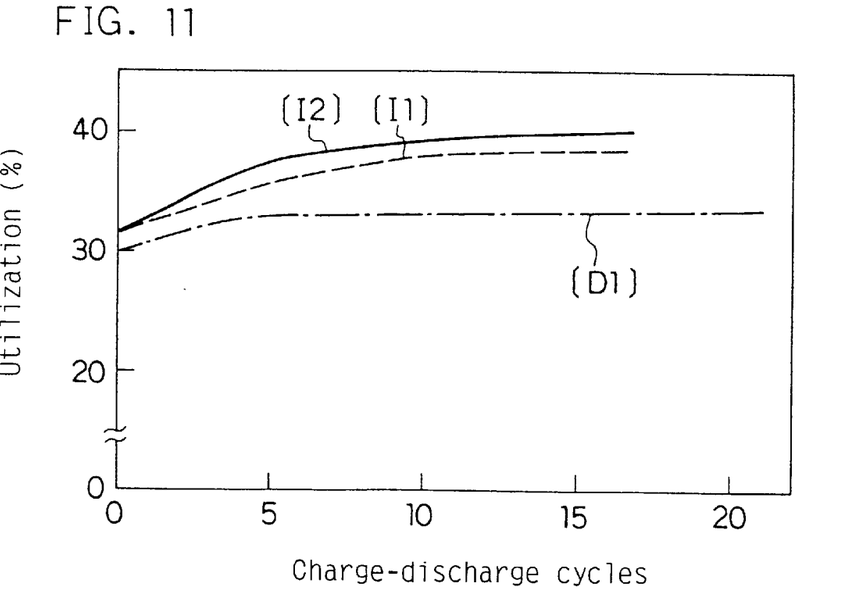
FIG. 11 is a diagram showing the charge-discharge cycles/utilization characteristics of lead acid storage batteries of a further embodiment.
Figure 12:
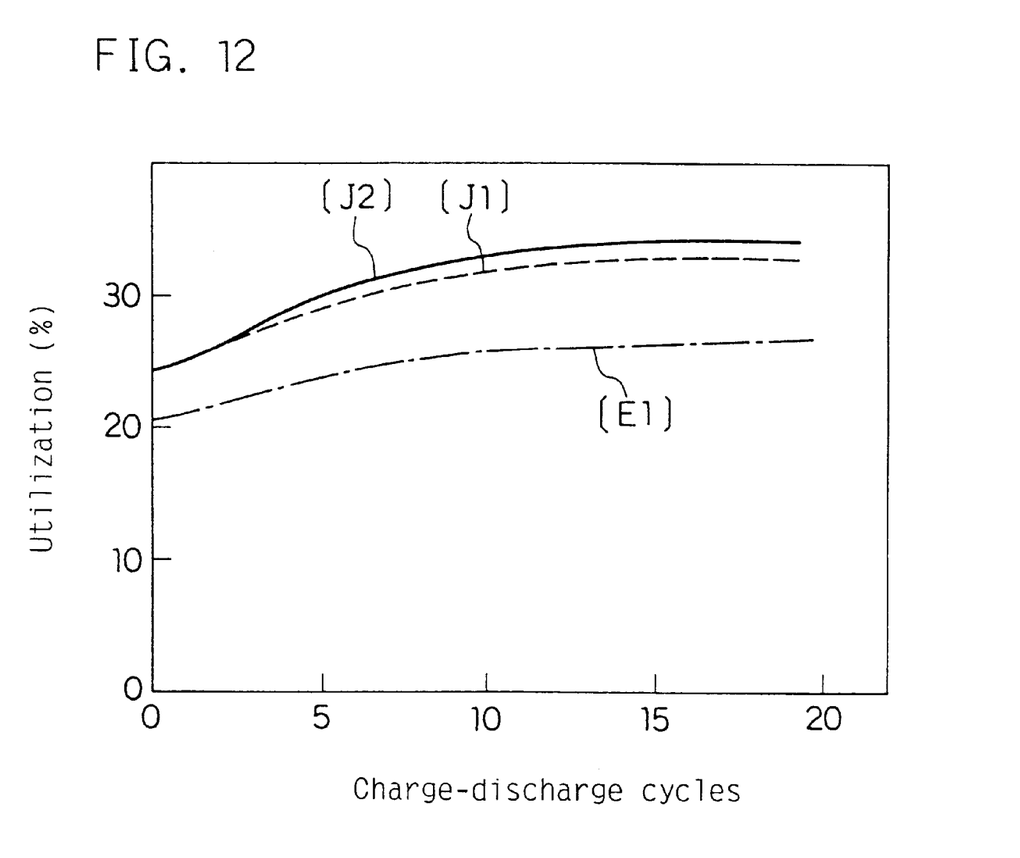
FIG. 12 is a diagram showing the charge-discharge cycles/utilization characteristics of lead acid storage batteries of still another embodiment.

These storage batteries were discharged at a current of 15 A corresponding to 5 C based on a 5-hour rate capacity of the positive electrode. FIG. 10, FIG. 11 and FIG. 12 are diagrams showing the resultant relationship between the charge-discharge cycles and the utilization of the active material and illustrating the effects of the present invention.

First, it was shown in FIG. 10, that, compared with the storage battery [RO] containing no hydrazinium sulfate, the utilizations in the hydrazinium sulfate (+1) containing storage battery [H1], the hydrazinium sulfate (+2) containing storage battery [H2], and the hydrazinium sulfate (+1) and hydrazinium sulfate (+2) containing storage battery [H3] all increased as the cycle advanced and then reached a constant level.

That the utilization rises with the repeated discharging and charging cycles indicates that hydrazinium sulfate works to create a condition for the positive electrode readily to discharge in the charging step after discharging.

There are no significant differences in the highest utilization eventually achieved in any form of hydrazinium sulfate, that is, between hydrazinium sulfate (+1) and hydrazinium sulfate (+2), but with regard to the time needed before the desired effect is achieved, the stronger reductive hydrazinium sulfate (+2) containing [H2] and [H3] appears to be quick in producing the effect.

FIG. 11 is a diagram illustrating the effects of adding hydrazinium sulfate together with a polysaccharide to the power generating element. When mannitol, a representative of the polysacchrides, was used and mixed with hydrazinium sulfate (+1) [I1] and hydrazinium sulfate (+2) [I2], both showed a high final utilization as compared with the comparative example [D1] in which mannitol alone was added, and reached the maximum level of utilization quickly. Also, in the utilization and utilization increase rate, hydrazinium sulfate (+2) was slightly superior.

FIG. 12 shows the effects of adding hydrazinium sulfate along with a chelating agent to the power generating element. As a representative chelating agent, EDTA was used, and when it was mixed with hydrazinium sulfate (+1) [J1] and hydrazinium sulfate (+2) [J2], both showed a high final utilization as compared with the comparative example [E1] in which EDTA alone was added, and reached the maximum utilization level quickly as in the case of mannitol. Also, in the utilization and utilization increase rate, hydrazinium sulfate (+2) was somewhat higher.

As illustrated, it is suggested that hydrazinium sulfate will have a favorable effect on the form of lead dioxide which is formed by charging, if present in dilute sulfuric acid concurrently with a polysaccharide or chelating agent which is capable of adjusting the solubility and activity of lead ions by coordinating to lead ions.

This mechanism is still unclarified. Especially, that the addition of hydrazinium sulfate causes decomposition of lead dioxide in part seems incompatible with creating a form of the active material with a high utilization. It is thought that those points are deeply related to the tendency to form a porous active material with a high distribution of fine pores. And in the charging process, decomposition, dissolution and deposition repeat delicately, recreating a new state of the active material as has not been formed before. Especially, when a polysaccharide and a chelating agent are present at the same time, that tendency is strong.

Mannitol and EDTA as mentioned here are a fraction of the embodiments, and these effects are similarly observed with polysacchrides and chelating agents which coordinate to lead ions to adjust the activity and the dissolved concentration of lead ions and show a tendency to raise the solubility and the decomposability of lead dioxide together with hydrazinium sulfate. By the way, the presence in the storage battery of nitrogen of hydrazinium sulfate can be detected by ICP spectrometry or combining ICP spectrometry with mass spectrum.

As has been described, the present invention is directed to improvements in the potential and utilization of lead acid storage batteries, of which potential has been considered to be determined by the concentration of dilute sulfuric acid and the structure of the active material, by adding, to dilute sulfuric acid, compounds which can adjust the solubility of lead ions.

As shown above, the present invention aims at improving the utilization at a high rate discharge especially of lead acid storage batteries through the effect of conventional or new additives which have been considered to induce a change in the reaction mechanism of lead acid storage battery, and the application scope covers all types of lead acid batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A lead acid storage battery comprising a power generating element and a lead ion solubility adjusting agent added to said power generating element, said lead ion solubility adjusting agent comprising hydrazinium sulfate and at least one selected from the group consisting of a saccharide, a chelating agent, and their derivatives.

2. The lead acid storage battery in accordance with claim 1, wherein said hydrazinium sulfate is a crystal or a solution of at least one of hydrazinium sulfate (1+) represented by $(N_2H_5)_2SO_4$ and hydrazinium sulfate (2+) represented by $N_2H_6SO_4$.

3. The lead acid storage battery in accordance with claim 1, wherein the total amount of said lead ion solubility adjusting agent selected from the group consisting of saccharide, chelating agent and their derivatives is not higher than 100 ppm by weight, based on the weight of the electrolyte.

4. The lead acid storage battery in accordance with claim 1, wherein the amount of said hydrazinium sulfate is not lower than 100 mg/l, based on the volume of the electrolyte.

5. A method for producing a lead acid storage battery comprising the steps of wetting at least a positive electrode with a dilute sulfuric acid solution with a concentration of at least one lead ion solubility adjusting agent selected from the group consisting of a saccharide, a chelating agent, their derivatives and hydrazinium sulfate, charging and discharging said positive electrode repeatedly, and fabricating a storage battery using said positive electrode and a dilute sulfuric acid solution having a concentration of said lead ion solubility adjusting agent lower than the concentration of said lead ion solubility adjusting agent in the wetting step.

6. A method of preparing an electrolyte solution, said method comprising:

(a) determining an effective addition amount of a lead ion solubility adjusting agent sufficient to increase the utilization of a lead acid storage battery, by comparing open circuit potentials of a positive electrode in a battery having a power generating element, a positive electrode and an electrolyte comprising a dilute sulfuric acid and variable amounts of the lead ion solubility adjusting agent with the open circuit potential of the positive electrode in dilute sulfuric acid without said lead ion solubility adjusting agent, in a charged state; and (b) combining the effective addition amount of said lead ion solubility adjusting agent determined in step (a) with a dilute sulfuric acid solution to form an electrolyte solution for a lead acid storage battery.

7. A method of preparing an electrolyte solution, said method comprising:

(a) determining an effective addition amount of a lead ion solubility adjusting agent sufficient to increase the utilization of a lead acid storage battery, by comparing potentials of electrolytic oxide of lead or a lead alloy in a battery having a power generating element, a positive electrode and an electrolyte comprising a dilute sulfuric acid and variable amounts of the lead ion solubility adjusting agent with the potential of electrolytic oxide of lead or a lead alloy in dilute sulfuric acid without said lead ion solubility adjusting agent, in a charged state; and (b) combining the effective addition amount of said lead ion solubility adjusting agent determined in step (a) with a dilute sulfuric acid solution to form an electrolyte solution for a lead acid storage battery.

* * * * *